United States Patent

Henry

[15] 3,684,963

[45] Aug. 15, 1972

[54] TRAVELING WAVE TUBE, FREQUENCY CONVERTING TELECOMMUNICATION REPEATER

[72] Inventor: Dominique Henry, Paris, France

[73] Assignee: Thomson-CSF

[22] Filed: April 13, 1970

[21] Appl. No.: 27,507

[30] Foreign Application Priority Data

April 18, 1969 France....................6912199
Jan. 6, 1970 France....................7000287

[52] U.S. Cl.....................325/11, 325/120, 330/43

[58] Field of Search..............325/9, 11, 120; 330/43; 331/82; 315/3.6

[56] References Cited

UNITED STATES PATENTS

| | | | |
|---|---|---|---|
| 3,128,433 | 4/1964 | Edson | 330/43 X |
| 2,770,722 | 11/1956 | Arams | 325/11 X |

*Primary Examiner*—Benedict V. Safourek
*Attorney*—Kurt Kelman

[57] ABSTRACT

A telecommunication repeater comprises a travelling wave tube which amplifier the received signal along a portion of the delay line thereof. The amplified signal is fed back to the input after undergoing a frequency change. The amplified signal at the frequency resulting from the frequency change is collected at the output of the tube.

1 Claim, 5 Drawing Figures

INVENTOR
DOMINIQUE HENRY
By
AGENT

INVENTOR
DOMINIQUE HENRY
By [signature]
AGENT

TRAVELING WAVE TUBE, FREQUENCY CONVERTING TELECOMMUNICATION REPEATER

The present invention relates to travelling wave tubes. More particularly the invention relates to telecommunication travelling wave tube repeater, especially those carried by satellites.

It is an object of the invention to simplify and to improve telecommunication repeaters using travelling wave tubes.

It will be at this stage recalled here that travelling wave tubes can operate in two main modes. In a first mode, while the input power increases, the output power rises as a linear function thereof, the gain remaining constant: the tube thus operates as a linear amplifier. In a second mode, as the input power continues to increase, the gain decreases the output power passes through a maximum and then decreases: the tube has reached saturation.

According to the invention there is provided an arrangement comprising a travelling wave amplifier having a first and a second delay line portion having respective ends; means for feeding to said tube a first and a second signal having different frequencies, means coupled to the end of said first delay line portion for collecting said first signal after amplification; and means coupled to the end of said second delay line portion for collecting said second signal after amplification.

For a better understanding of the invention reference will be made to the drawing accompanying the following description and in which.

The same reference numbers designate the same elements in all the figures.

Figure 1:
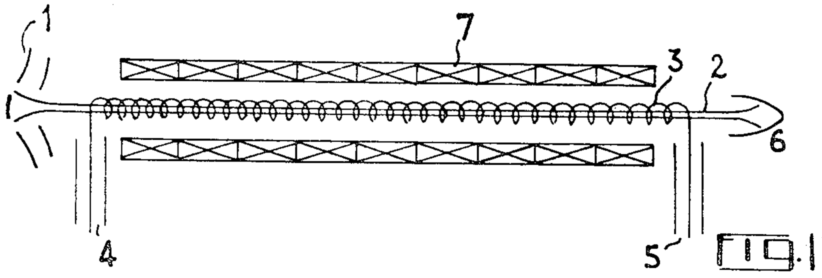
FIG. 1 is a diagrammatical view in section of a conventional travelling wave tube.

The tube shown in FIG. 1 comprises an electron-gun 1 emitting an electron beam 2; a delay line 3 along the axis of which the electron beam 2 propagates and which is coupled at its input 4 to a high-frequency power source (not shown) providing the energy to be amplified and at the output 5 to the load (not shown) to which the high-frequency amplified power is applied; a collector 6; coils or magnets 7 which produce the magnetic field required to guide the electron beam 2 through the delay line 3. The attenuation which is essential for the proper operation of the tube as an amplifier, has not been shown: it is assumed in this example to be embodied within the delay line itself, either by appropriate choice of the metal of which the line is made or by the provision of a resistive coating on the same.

The operation of a travelling wave is entirely conventional and therefore need not be described.

Figure 2:
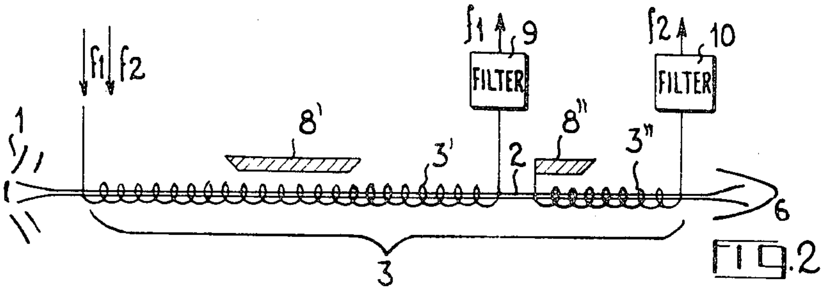
FIG. 2 is a schematic view of a travelling wave tube modified in accordance with the invention illustrating these elements of the tube which are essential to an understanding of its operation.

The tube shown in FIG. 2 comprises the same elements as the tube of FIG. 1, the attenuation having been shown in the form of separate elements 8' and 8''.

However, the tube according to the invention comprises two separate delay line sections, 3' and 3'', placed in extension of one another and having separate loads 9 and 10, respectively coupled to these outputs.

The tube of FIG. 2 operates as follows:

Two waves of respective frequencies $f_1$ and $f_2$, whose amplitudes are very substantially different from one another the amplitude of the wave having the frequency $f_2$ being much higher than that having the frequency $f_1$, are fed to the tube input. These waves, on propagating through the section 3' of the delay line, undergo amplification in a conventional manner, with for example a power gain of around 40 db.

Along the section 3', the tube operates in the linear mode, and there are obtained in the load 9, two amplified high-frequency waves with respective frequencies $f_1$ and $f_2$, with little cross-modulation, the highest amplitude, at the frequency $f_2$, being insufficient at this stage of amplification to disturb seriously the wave of frequency $f_1$.

The load 9 is designed in any conventional manner to absorb the frequency $f_2$ and to pass the frequency $f_1$. Thus, only an amplified wave of frequency $f_1$ is obtained at the output of the load 9.

The electron beam 2 continues its trajectory through the delay line section 3'' towards the collector 6, the amplification of both waves goes on and the saturation condition is reached or about to be reached. The result is that in the load 10 there is a high-power level at the frequency $f_2$ while the amplitude of the frequency $f_1$ wave is much lower. Also, cross-modulation between frequencies $f_1$ and $f_2$, will be observed but the parasitic frequencies have a very much lower amplitude than $f_2$. Only the wave of this latter frequency is picked up beyond the filter 10.

As already mentioned the invention finds a particularly important application in telecommunication repeaters with frequency-change.

Figure 3:
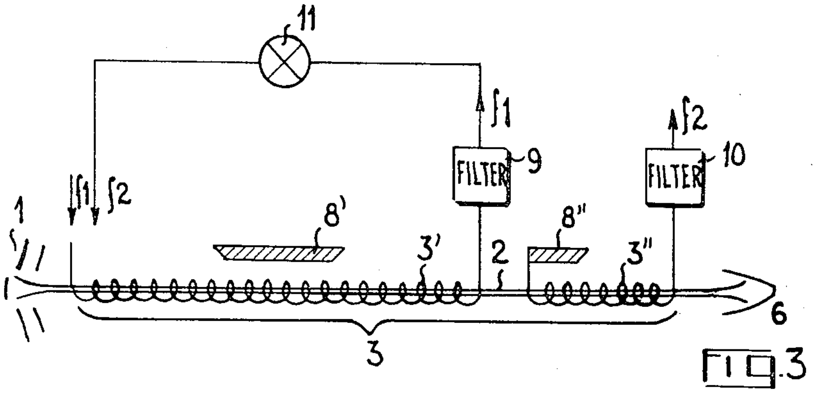
FIG. 3 is a schematic view of a circuit utilizing a travelling wave tube according to the invention.

The tube is then mounted as shown in FIG. 3. Only the wave at the frequency $f_1$ is fed to the input of the tube. The output of the load 9 is fed back to the input after the changing of the frequency in a mixer 11 associated with a local oscillator. Then at the output of the load 10 a wave at the frequency $f_2$ is collected.

Thus, amplification and a frequency-change are performed by means of a single tube, which is particularly advantageous in satellite carried repeaters.

The invention is in no way limited to the example described. It is in particular, possible to have no discontinuity in the delay lines 3, the intermediate output to the load 9 being coupled to the line through one or more loops wound in around the delay line.

It is also possible, to effect the amplification of more than two waves of different frequencies and amplitudes, each of them being picked up after amplification at a separate output.

The invention will now be described as applied to telecommunication repeaters.

As is known, a telecommunication repeater is essentially a transmitter-receiver system capable of receiving low level signals having a carrier frequency FR and to retransmit them after amplification at a generally different carrier frequency FE.

Such repeaters generally comprise an intermediate frequency amplifier which is preceded and followed by frequency-changer stages. Thus the amplification is mainly achieved on a signal at the intermediate frequency, i.e. at a suitably selected fixed frequency. However, if one of the frequencies FR and FE is modified this involves the modification of the local oscillator frequency with all the inherent complications.

Since generally the frequencies assigned to repeaters, in particular to those carried by satellites, are so selected that the difference FE-FR is constant in absolute value, this inconvenience can be avoided by forming the repeater with a single frequency changer stage whose local oscillator frequency is FE-FR and two broad band amplifier stages for the signals at the frequencies FE and FR, respectively.

This solution, when applied to higher frequencies, for example in the 4Ghz band for the transmitting frequency FE and 6 Ghz for the receiving frequency FR, results in bulky and expensive arrangements, in particular because two travelling wave tubes are to be used.

It is also known to use a "reflex" arrangement with a single travelling wave tube which simultaneously amplifies both the frequency FE and the frequency FR waves. However, this tube would have to be operated at saturation in order to deliver a maximum of power at the frequency FE, which would result in substantial distortion, making thus necessary to limit the output power at a level several db below the maximum.

Figure 4:
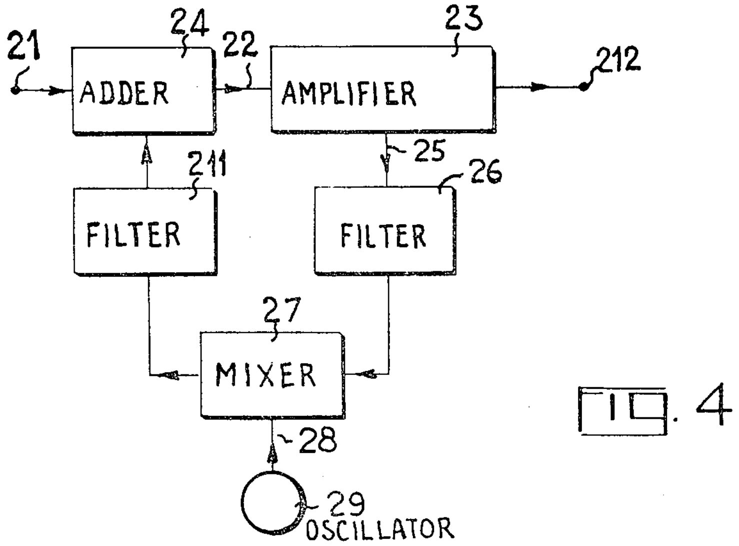
FIGS. 4 and 5 show embodiments of telecommunication repeaters according to the invention.

In the repeater shown in FIG. 4 the received signals are applied to the input 21 of an adder 24 which in turn feeds the input 22 of an amplifier 23. The amplified signal at the frequency $f1$ is picked up at the output 25 of the amplifier 23 and, through a filter 26 which absorbs signals at the frequency $f_2$, is applied to a mixer 27, associated with a local oscillator 29, operating at a frequency FM and which is connected to the input 28 of this mixer. The output signal of the mixer 27 is applied, through a filter 211 which passes only the signals at the frequency $f_2$, to a second input of the adder 24. The amplifier output signal at the frequency $f_2$ is collected at the output 212 thereof. The output level is at a maximum so that saturation is reached.

The assembly is similar to that of FIG. 3, and the amplifier 23 is that shown in this latter figure. The position of the output 25 is selected to obtain a maximum of amplification, while avoiding any distortion.

This arrangement does not depend on the frequencies assigned to the repeater within a given frequency band, with $f_1$, for example, comprised between 5,925 and 6,425 Mc/s and $f_2$ between 3,700 and 4,200 Mc/s, provided the difference $f1$-$f2$ is constant and equal to FM say 2.5 Gc/s. The construction of filters 26 and 211 with a sufficiently broad passband is not a problem for those skilled in the art.

Also the construction of travelling wave tubes whose passband covers the whole of the frequency band assigned to $f1$ and $f2$, for example between 3,700 and 6,425 Mc/s does not set any particular difficulties. It should be noted for this is not needed for the output portion of the tube where the passband must be only between 3,700–4,200 Mc/s especially as the frequency $f1$ is damped.

Figure 5:
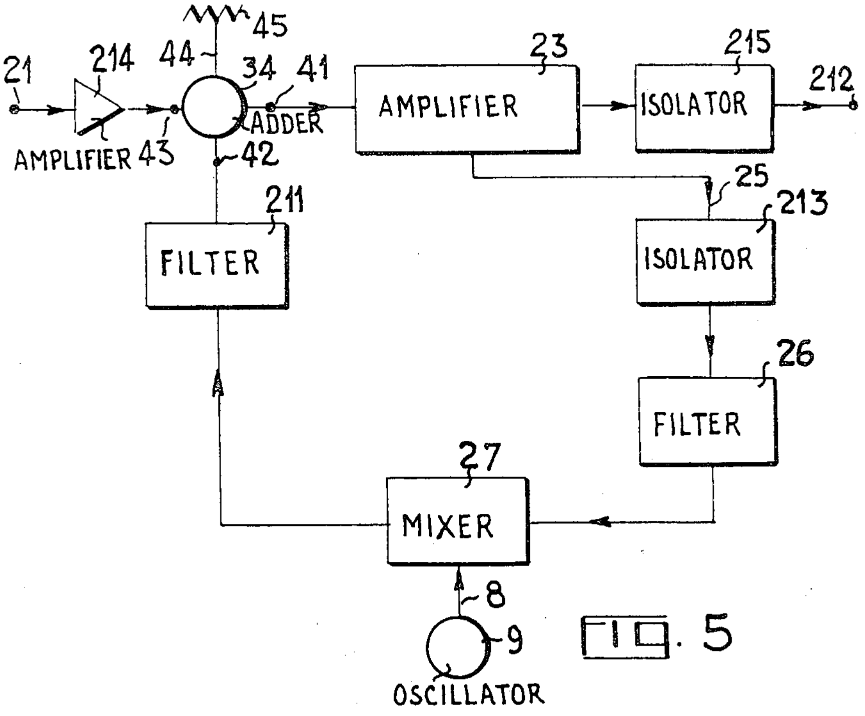

FIG. 5 shows in greater detail some further elements of the structure of the system of FIG. 4.

In this embodiment the adder is a circulator 34 having four inputs 41 to 44. The input 44 is connected to a balancing resistor 45. An amplifier 214 is provided between the input 21 and the input 43. Isolating devices 215 and 213 are provided at the outputs of the amplifier 23.

The amplifier 214 is in particular aimed at improving the noise figure. It may be a tunal-diode amplifier.

In one embodiment of the invention the gain obtained with this amplifier was 30db with a noise figure of 5 to 6 db in the GGc/s band. The travelling wave amplifier had a gain of 37 dB for the frequency $f1$ signal and 57 db for the frequency $f2$ signal. Thus the overall gain was 124 db, of which 12 db were lost in the frequency transposition circuit. A signal of 20 watts at the frequency $f2$ was obtained with a received signal at −69 dbm.

Isolating devices 213 and 215 may be in the form of three input circulators which have a broad passband covering the $f1$ and $f2$ frequency band.

Of course the invention is not limited to the embodiment described and shown which were given solely by way of example.

What is claimed, is:

1. A telecommunications repeater which comprises
   1. a travelling wave amplifier having a delay line divided into first and second portions, each portion having an input end and an output end, with reference to the direction of travel of an electron beam through said amplifier;
   2. means connected to the input end of said first delay line portion for supplying a signal of frequency $f_1$ to said repeater, from an external source;
   3. a mixer circuit including a local oscillator of frequency ($f_2 - f_1$, where $f_2$ is the frequency of the desired output signal from said repeater, having its input connected to the output end of said first portion and its output connected to the input end thereof, to supply a signal of frequency $f_2$ to said input end; and
   4. circuitry connecting the output end of said second delay line portion to an external load, said load receiving an amplified signal of frequency $f_2$ from said repeater.

* * * * *